No. 11,717. Reissued Feb. 14, 1899.

J. W. PEARSON.

TRAWL NET.

(Application filed Dec. 8, 1898.)

2 Sheets—Sheet 1.

Witnesses

H. B. Tufts

Bruce S. Elliott

Inventor

James W. Pearson

By

James L. Norris

Atty

THE NORRIS PETERS CO., PHOTO-LITHO., WASHINGTON, D. C.

No. 11,717.

Reissued Feb. 14, 1899.

J. W. PEARSON.

TRAWL NET.

(Application filed Dec. 8, 1898.)

2 Sheets—Sheet 2.

Witnesses

Bruce A. Elliott

Inventor

James W. Pearson

By James L. Norris

Atty.

THE NORRIS PETERS CO., PHOTO-LITHO., WASHINGTON, D. C.

UNITED STATES PATENT OFFICE.

JAMES WILLIAM PEARSON, OF LONDON, ENGLAND, ASSIGNOR OF ONE-HALF TO WILLIAM JOHN WOOD, OF SAME PLACE.

TRAWL-NET.

SPECIFICATION forming part of Reissued Letters Patent No. 11,717, dated February 14, 1899.

Original No. 611,931, dated October 4, 1898. Application for reissue filed December 8, 1898. Serial No. 698,685.

*To all whom it may concern:*

Be it known that I, JAMES WILLIAM PEARSON, minister of the Presbyterian church of England, a subject of the Queen of Great Britain, residing at London, England, have invented certain new and useful Improvements in or Relating to Trawl-Nets, of which the following is a specification, reference being had to the accompanying drawings, in which—

Figure 3:
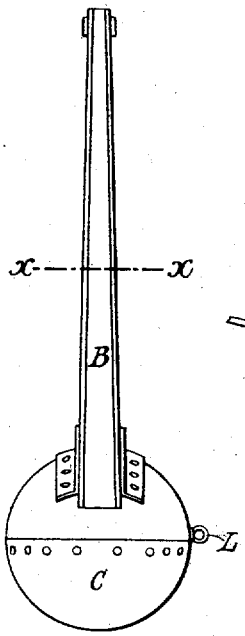
Figure 1:
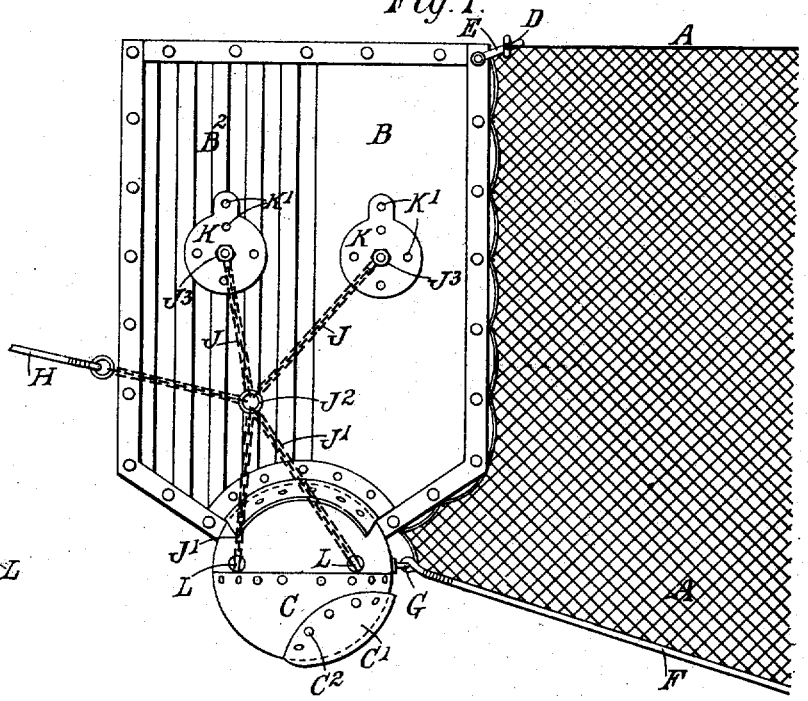
Figure 4:
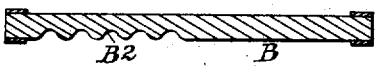
Figure 7:
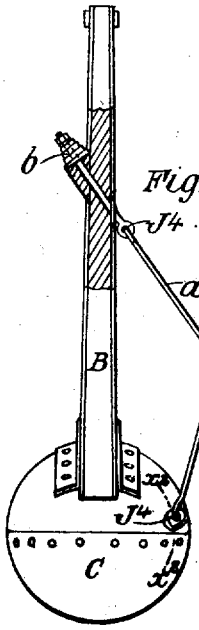
Figure 8:
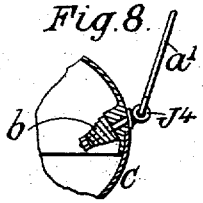
Figure 2:
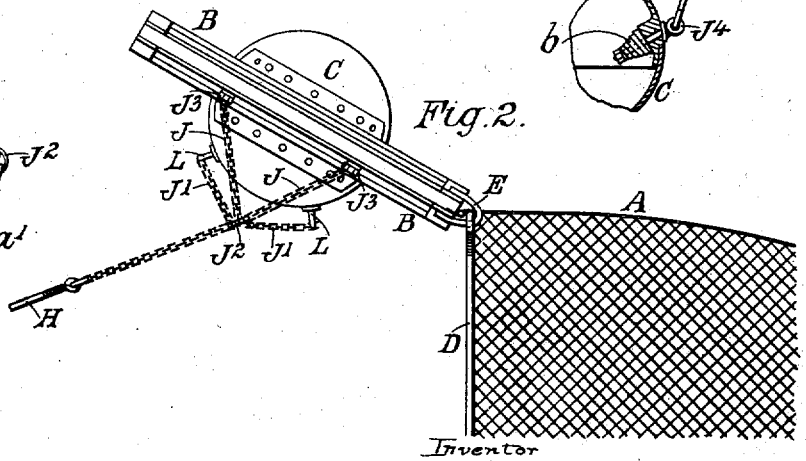
Figure 5:
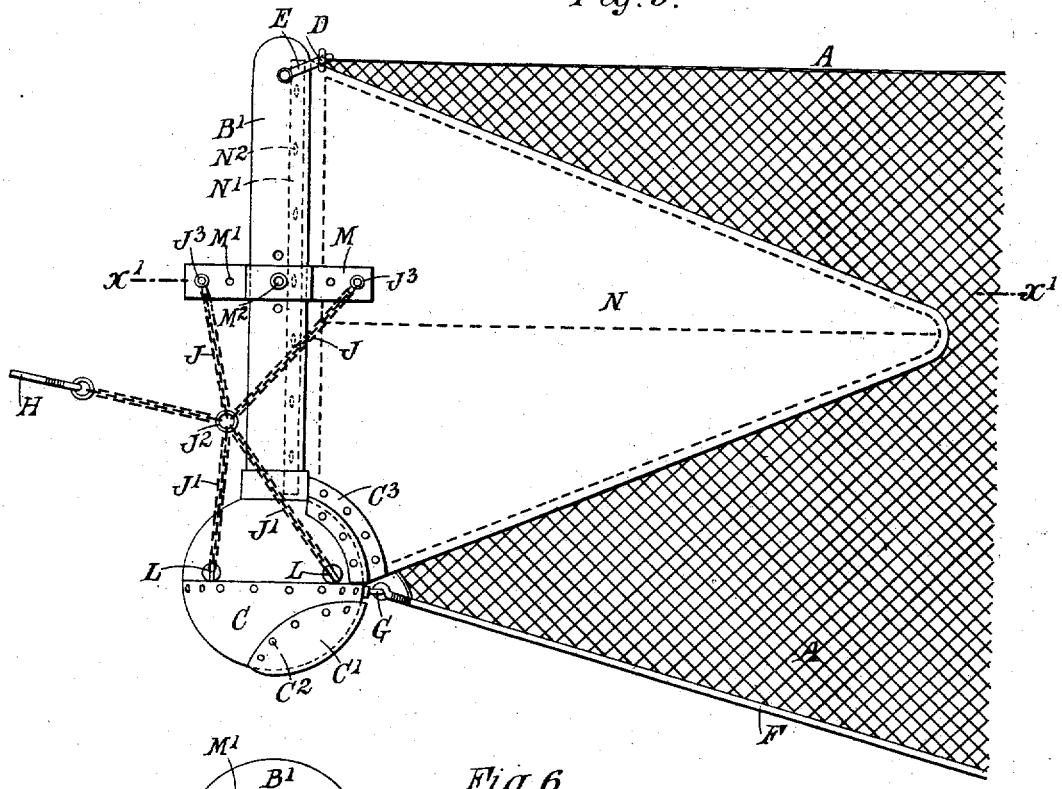
Figure 6:
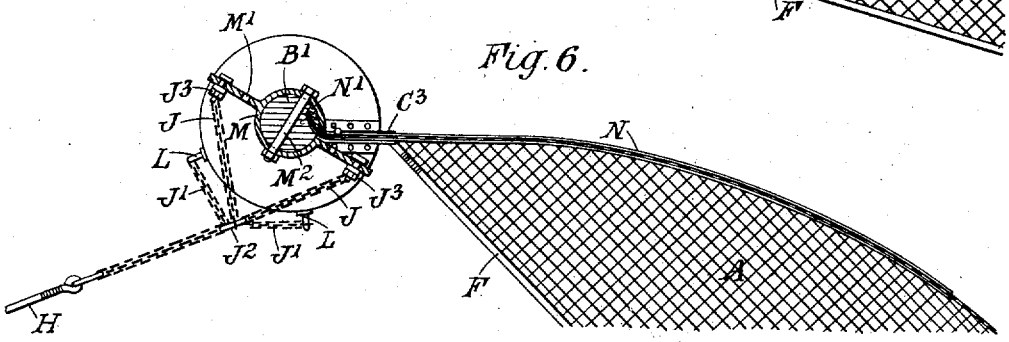

Figure 1 is an inside view, and Fig. 2 a plan, showing one wing of a trawl-net having my improvements applied thereto. Fig. 3 is an edge view of the spreader-board and sphere; and Fig. 4 is a section on the line $x\ x$, Fig. 3, showing the corrugations in the spreader-board. Fig. 5 is a similar view to Fig. 1, illustrating another form or modification of my invention. Fig. 6 is a section on the line $x'\ x'$, Fig. 5. Fig. 7 is an edge view, partly in section; and Fig. 8 is a section on the line $x^2\ x^2$, Fig 7, illustrating a further modification of my said invention.

My invention relates to trawl-nets, and is chiefly designed to provide more efficient means than have heretofore been employed for keeping the net extended to its full capacity without the use of the usual horizontal beam, and to provide for maintaining the spreader-boards or upright beams used in place thereof in an upright or nearly upright position in the water notwithstanding stoppages or slowing down of the vessel by which the net is being dragged. My improved net can therefore be advantageously used both with sailing vessels and with steamers.

An important feature of my said invention is the employment of self-righting spreader-boards or upright beams—that is to say, spreader-boards or upright beams attached to the sides or wings of the net and mounted upon balancing-spheres or other suitably weighted or ballasted rounded bodies in such a manner that should they be pulled or pushed over in any direction they will at once resume their upright or nearly upright position or can be very easily brought back to this position by a pull upon the towing chains or warps without the necessity for hauling in the net. By these means also the gear can travel very easily over the sea-bottom, so that the net will do its work with less noise and friction than heretofore, and the mouth of the net will be kept open even when the net is stationary in the water, and will therefore be capable of capturing a larger quantity of fish than the nets heretofore used.

Another feature of my said invention is the provision of what I term "wing-spreaders," which are secured in the wings of the trawl-net and which by intercepting or offering resistance to the flow of the water through the net at the wings cause the automatic extension of the net by the action of the water. A larger net can therefore be used than is practicable with the ordinary horizontal beam-trawl or with the ordinary "otter-board" trawl.

My said invention also comprises other improvements hereinafter set forth.

The forward end of each wing of the net A is attached either to a spreader-board B or to a vertical beam B′. Each of the said spreader-boards or upright beams is mounted on a hollow balancing-sphere C, which is made of sheet-iron or other suitable material, preferably incased with soft wood or other protecting material, and is ballasted by being partly filled with lead or other heavy material secured in position therein, so that the center of gravity of the whole will be below the center of the sphere, and when the said sphere is placed on a flat surface the spreader-board or beam will assume an upright or nearly upright position. If the said board or beam be made of wood, its buoyancy will promote this self-righting action when the net is immersed in water.

Each of the spheres C is provided on its under side with a wearing-shoe C′, of steel or other suitable material, which is secured in position by screws $C^2$ or other suitable fastenings, so that when worn it can be easily removed and replaced by a fresh one. These shoes ride over the sea-bottom and prevent wear of the material of which the sphere is constructed.

The spreader-boards B are tapered from the bottom upward, as shown in Fig. 3, so as to make them as strong as practicable, while reducing to a minimum their weight and their resistance to being drawn through the water. The part of the board B forward of its center may advantageously be provided with vertical grooves or corrugations $B^2$ on its inner side, as more clearly shown in Fig. 4, so as to assist in maintaining the said board at the desired angle or sheer as it is moved relatively to the water and so that when the water passing up the corrugations arrives at the smooth or uncorrugated part above them it will slip over the top of the board. The spheres C serve to maintain the said boards or beams in the desired position in the water whether the net is being dragged along or is stationary. Therefore the mouth of the net will be kept open even when the net is stationary in the water, and the net will consequently be capable of capturing a larger quantity of fish than the nets heretofore used. Moreover, my spheres and spreader-boards or beams are much lighter than the otter-boards hitherto employed and the net will do its work with less noise and friction than those provided with such otter-boards.

The head-line D of the net is preferably secured to an eye E at the upper part of the spreader-board B or beam B′. It may, however, be secured to the said board or beam at a lower point. The ground-rope F is secured to an eye G on the balancing-sphere C. The wing-line, if such be employed, is also attached to the board B or beam B′.

The tow ropes or warps H are attached to two sets of chains J J′ through a ring $J^2$, the chains J in the arrangement shown in Fig. 1 being each attached to an eyebolt $J^3$, secured in one or other of a series of holes K′ in plates K, attached to the spreader-board B, and the chains J′ to eyes L on the spheres C. By shifting the eyebolts $J^3$ from one to another of the holes K′, I am enabled to adjust the amount of "sheer" or inclination of the spreader-boards B and also to vary the slip of the water over the top thereof, the latter result being more especially useful when the head-line D is attached to the spreader-board at a point below the top thereof, as it prevents the flow of the water from the said board onto the top of the net.

When I use upright beams B′, as shown in Figs. 5 and 6, I secure the eyebolts $J^3$ in holes M′ in a transverse bar M, which is adjustable vertically on the beam B′ and is adapted to be secured in position by means of a bolt $M^2$, passing through one or other of a series of holes in the beam B′.

In the arrangement shown in Fig. 5 in each wing of the net A, at the end thereof next to the beam B′, is sewed or otherwise secured a wing-spreader N, consisting of a triangular or other suitably-shaped piece of sail-cloth, canvas, or other suitable material. This wing-spreader and the forward end of the wing of the net are clamped to the beam B′ by means of a metal bar N′ and bolts $N^2$ and to the spheres C by means of flanges $C^3$. The said wing-spreaders are so shaped as to prevent the passage of the water through the wings of the net at this part in such a manner that the said wings will be forced outward and the net distended or inflated as it is dragged along in the water.

In the case of large nets wing-spreaders N can be employed in combination with spreader-boards B, such as that shown in Fig. 1.

When the net is in motion and the ballasted spheres C, with the spreader-boards B or upright beams B′, are being pulled through the water, the water acts upon the same and upon the wing-spreaders N (when such are employed) in such a manner as to keep the net extended to its utmost capacity, and the whole gear moves on the smooth round surfaces of the said spheres, thus reducing the noise and friction to a minimum. The maintenance of the spreader-boards or upright beams always in an upright or nearly upright position efficiently obviates the liability to fouling or entanglement of the trawl-gear.

The aforesaid upright beams are to be used as an alternative for the spreader-boards and in a rough sea are very advantageous for casting and raising the net.

The spreader-boards or upright beams in my improved gear will right themselves should they happen to be pushed or pulled over in any direction. Waste of time and labor in hauling in the net for the purpose of righting the spreader-boards is therefore entirely avoided by my invention.

It is evident that I can, if desired, use other suitably weighted or ballasted rounded bodies in place of the spheres for effecting the righting of the spreader-boards or upright beams without the necessity for hauling in the net and to facilitate the travel of the gear over the sea-bottom.

I sometimes use, in combination with the spreader-boards or upright beams, spring-brackets, whereby the pull of the towing ropes or warps is more equally distributed over the whole of the board. These spring-brackets are shown in Figs. 7 and 8. They are attached to the spreader-boards B or to the upright beams and to the balancing-spheres, as shown, (for the attachment of the towing ropes or warps,) and serve in place of the ordinary slings or metal brackets of the otter-boards. Each bracket consists of two rods *a* *a*′, that take the place of the chains J J′ and are coupled at one end to an eyebolt $J^4$, the shank of which extends through a hole in the board B or sphere C and is provided with a volute or spiral spring *b*. The outer end of each rod *a* or *a*′ is coupled to the towing chain or warp, so that the said brackets are not rigid, but are free to move through a small angle. The pull or stress first passes through the spring-brackets and then through the spreader-boards or upright beams or the spheres to the net, and by means of the various attachments is distributed equally over the whole net.

I am aware that spreader-boards for trawl-nets have been provided with shoes of spherical or egg shape, one at or near each end of the board, in order to diminish the resistance to towing; but these shoes have not been so arranged as to make the board self-righting, and it is evident that when each board is provided with two of such shoes it is impossible that the board can, like mine, be made self-righting from every direction. Moreover, should one shoe catch against a rock a heavy strain will be thrown upon the towing-chains, whereas when each spreader-board is mounted upon a single balancing-sphere, as above described, it can easily move to one or the other side should the said balancing-sphere come against a rock.

What I claim is—

1. In combination with a trawl-net, spreader devices, which are attached to the sides or wings of the net, and each of which is mounted in a substantially vertical position on a single weighted or ballasted balancing-sphere, the weight being so distributed that, when the net and gear are immersed, the center of gravity of the whole is below the center of the sphere, substantially as, and for the purposes, above specified.

2. The combination, with a trawl-net, of spreader devices, attached to the wings of the net, ballasted bodies on which said spreader devices are mounted respectively, and wing-spreaders secured to the sides of the net, substantially as described.

3. The combination, with a trawl-net, of spreader-boards attached to its sides, or wings, and having longitudinal grooves, or corrugations, in the forward part of their operative surface, substantially as described.

4. The combination, with a trawl-net, of spreader-boards attached to the sides, or wings, and provided with longitudinal grooves, or corrugations, in the forward part of their operative surface, and ballasted bodies upon which said boards are mounted respectively, substantially as described.

5. The combination, with a trawl-net, of spreader-boards attached to the sides, or wings, of the net and provided with longitudinal grooves in the forward part of their operative surface, and ballasted spherical or rounded bodies upon which said boards are mounted respectively in a substantially vertical position, substantially as described.

6. The combination, with a trawl-net, of spreader-boards secured to the sides, or wings, and provided with longitudinal grooves or corrugations in the forward part of their operative surface, ballasted spherical or rounded bodies on which said boards are mounted respectively in a substantially vertical position, and wing-spreaders secured to the sides of the net, substantially as described.

7. The combination, with a trawl-net, of spreader-boards attached to its sides, or wings, which are tapered from their lower to their upper ends, weighted or ballasted balancing-spheres on which the said boards are mounted, and towing chains or warps attached to said boards and spheres, substantially as described.

8. The combination, with a trawl-net, of spreader devices attached to its sides or wings, balancing-spheres on which said spreader devices are mounted respectively, a towing-warp, eyebolts in said spreader devices and spheres respectively, links connecting said eyebolts respectively with said towing-warp, and springs on said eyebolts, substantially as, and for the purposes, above specified.

In testimony whereof I have hereunto set my hand in the presence of two subscribing witnesses.

JAMES WILLIAM PEARSON.

Witnesses:
DAVID YOUNG,
ALEXANDER W. ALLEN.